(12) United States Patent
Cameron

(10) Patent No.: US 9,221,310 B1
(45) Date of Patent: Dec. 29, 2015

(54) PADDLE ACCESSORY FOR USE WITH A VEHICLE TIRE

(71) Applicant: Jody L. Cameron, Norco, CA (US)

(72) Inventor: Jody L. Cameron, Norco, CA (US)

(*) Notice: Subject to any disclaimer, the term of this patent is extended or adjusted under 35 U.S.C. 154(b) by 266 days.

(21) Appl. No.: 13/954,023

(22) Filed: Jul. 30, 2013

(51) Int. Cl.
*B60C 11/02* (2006.01)
*B60C 27/20* (2006.01)

(52) U.S. Cl.
CPC .................................... *B60C 27/20* (2013.01)

(58) Field of Classification Search
CPC .............................. B60C 27/08; B60C 27/086
USPC .................................................. 152/221, 222
See application file for complete search history.

(56) References Cited

U.S. PATENT DOCUMENTS

| | | | | |
|---|---|---|---|---|
| 2,608,232 A * | 8/1952 | Kennedy | ...................... | 152/221 |
| 2,739,633 A * | 3/1956 | La Vigueur | .................... | 152/222 |
| 2,753,912 A * | 7/1956 | Mallow | ......................... | 152/175 |
| 4,093,012 A * | 6/1978 | Detwiler | ....................... | 152/226 |
| 4,306,603 A * | 12/1981 | Dighe et al. | ................... | 152/222 |
| 4,402,357 A * | 9/1983 | Granryd | ......................... | 152/216 |
| 4,456,047 A * | 6/1984 | Ishida | ........................ | 152/213 A |
| 4,480,670 A * | 11/1984 | Payne | ............................ | 152/169 |
| 4,513,801 A * | 4/1985 | Pedrick et al. | ............. | 152/213 R |
| 4,749,015 A * | 6/1988 | Miyagawa | .................. | 152/213 A |
| 5,318,087 A * | 6/1994 | Chang Gun | ................... | 152/241 |
| 5,624,509 A * | 4/1997 | Stanley | ...................... | 152/213 R |
| 5,716,106 A * | 2/1998 | Warner | ........................ | 301/40.1 |
| 6,675,850 B2 * | 1/2004 | Sakuma | ......................... | 152/221 |
| 6,860,304 B1 * | 3/2005 | Dalrymple | ..................... | 152/175 |
| 8,651,154 B1 * | 2/2014 | Chira et al. | ................... | 152/221 |
| 8,979,213 B2 * | 3/2015 | Curry | ............................ | 301/44.1 |
| 2002/0088519 A1 * | 7/2002 | Wilkinson | ..................... | 152/221 |
| 2005/0224152 A1 * | 10/2005 | Zumach | ........................ | 152/222 |
| 2008/0252135 A1 * | 10/2008 | Mills et al. | ................... | 301/40.1 |
| 2010/0276046 A1 * | 11/2010 | Maltezos | ....................... | 152/216 |
| 2015/0053322 A1 * | 2/2015 | Curry et al. | ................... | 152/221 |

* cited by examiner

*Primary Examiner* — Jeffrey J Restifo
(74) *Attorney, Agent, or Firm* — Kyle A. Fletcher, Esq.

(57) ABSTRACT

The tire traction assembly for increasing traction in a granular material includes a band that may be wrapped around a tire. A paddle is coupled to the band so the paddle may engage a granular material when the tire is rotated. A coupler is coupled to the band so the coupler retains the band on the tire.

18 Claims, 3 Drawing Sheets

PADDLE ACCESSORY FOR USE WITH A VEHICLE TIRE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of vehicle tires, more specifically, a paddle accessory configured for use with the vehicle tire.

SUMMARY OF THE INVENTION

An embodiment of the disclosure meets the needs presented above by generally comprising a band that may be wrapped around a tire. A paddle is coupled to the band so the paddle may engage a granular material when the tire is rotated. A coupler is coupled to the band so the coupler retains the band on the tire.

An object of the invention is to provide a paddle accessory configured for use with a vehicle tire, and which adds increased traction to the tire when installed thereon.

These together with additional objects, features and will be readily apparent to those of ordinary skill in the art upon reading the following detailed description of presently preferred, but nonetheless illustrative, embodiments of the paddle accessory for use with a vehicle tire when taken in conjunction with the accompanying drawings.

In this respect, before explaining the current embodiments of the paddle accessory for use with a vehicle tire in detail, it is to be understood that the paddle accessory for use with a vehicle tire is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the paddle accessory for use with a vehicle tire.

It is therefore important that the claims be regarded as including such equivalent construction insofar as they do not depart from the spirit and scope of the paddle accessory for use with a vehicle tire. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
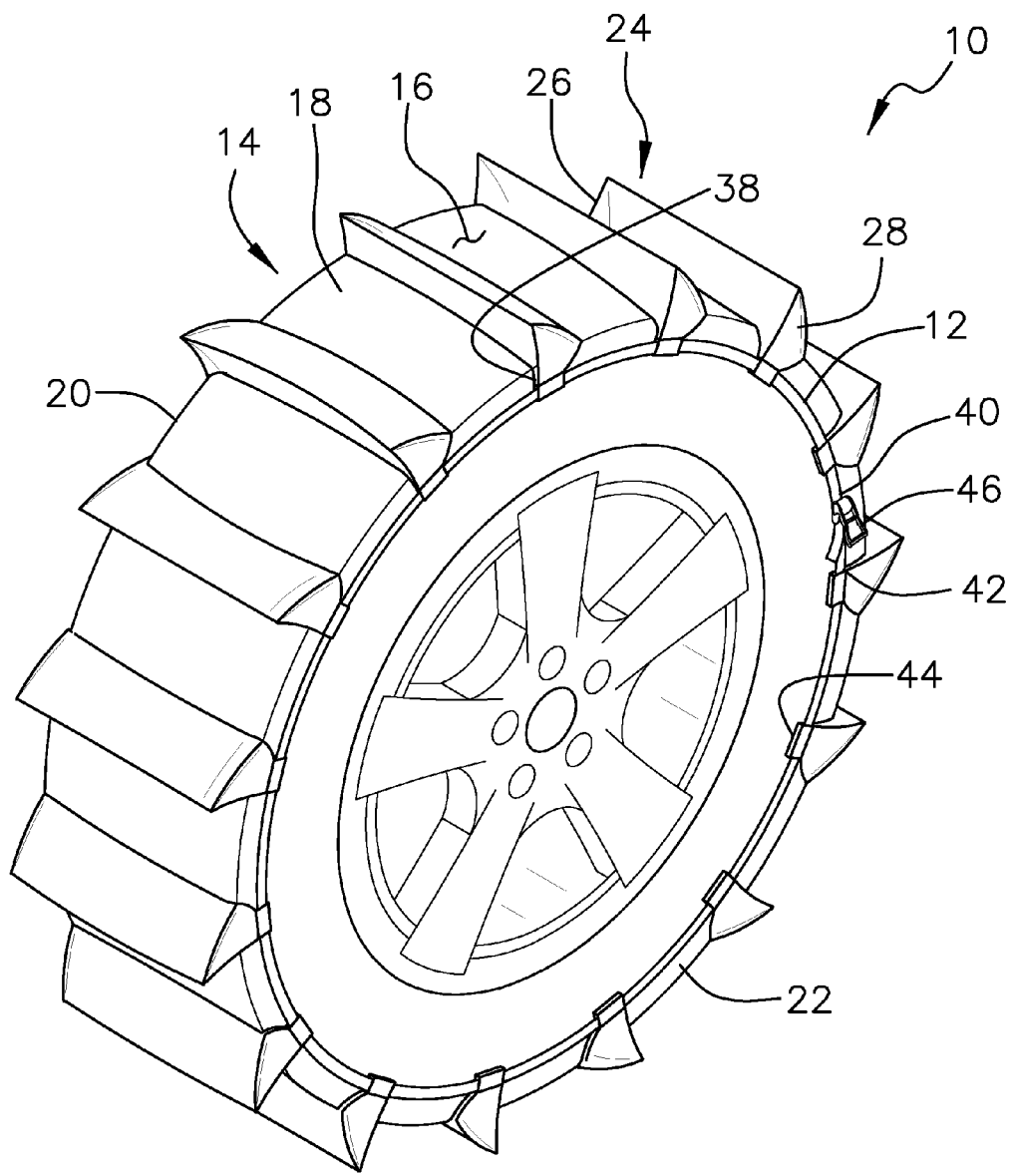
FIG. 1 is an in-use view of a tire traction assembly according to an embodiment of the disclosure.
Figure 2:
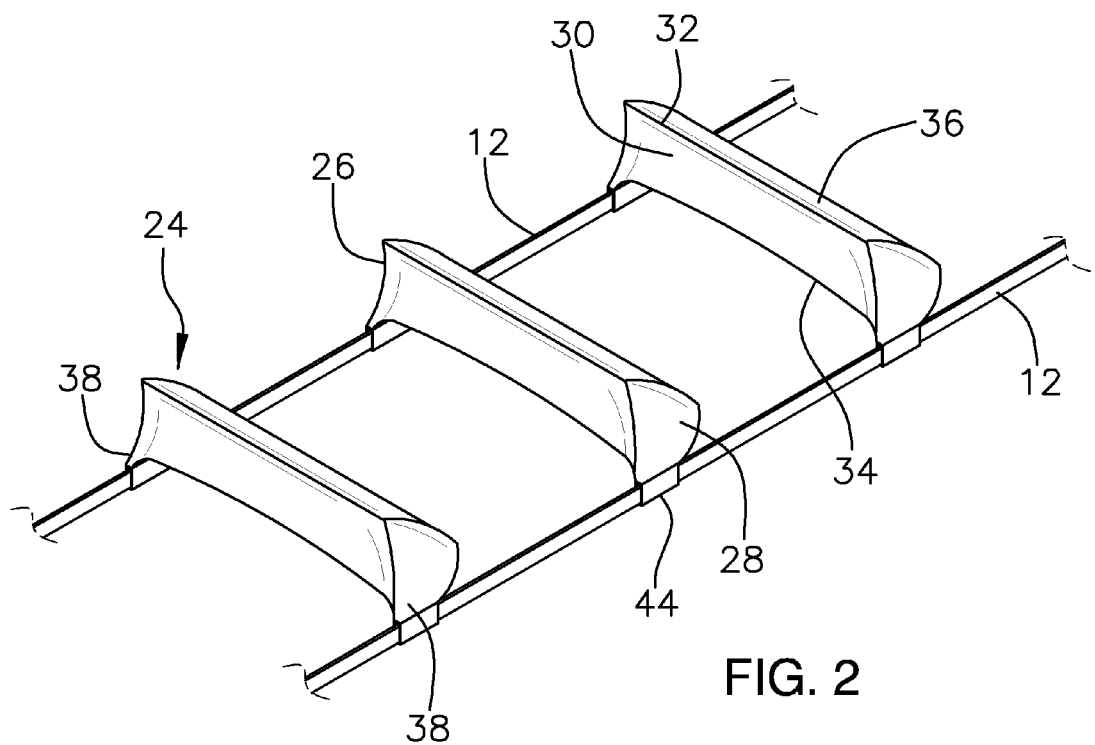
FIG. 2 is a top perspective view of an embodiment of the disclosure.
Figure 3:
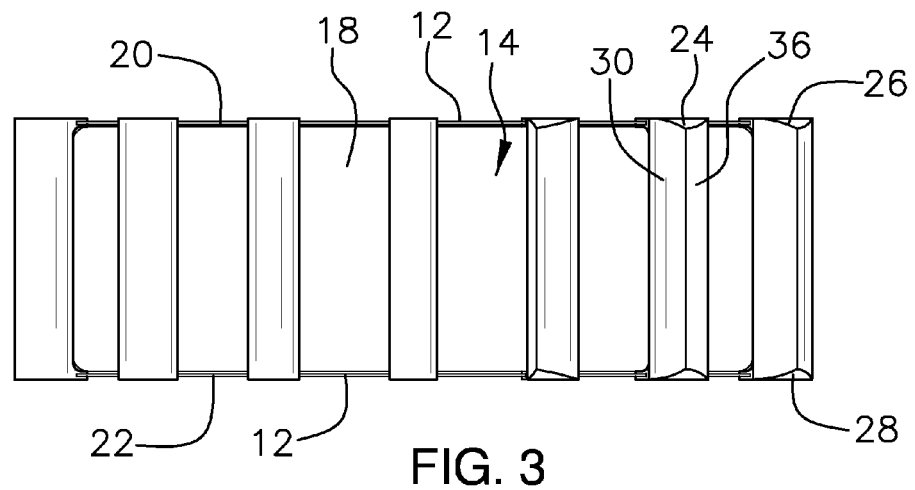
FIG. 3 is a top view of an embodiment of the disclosure.
Figure 4:
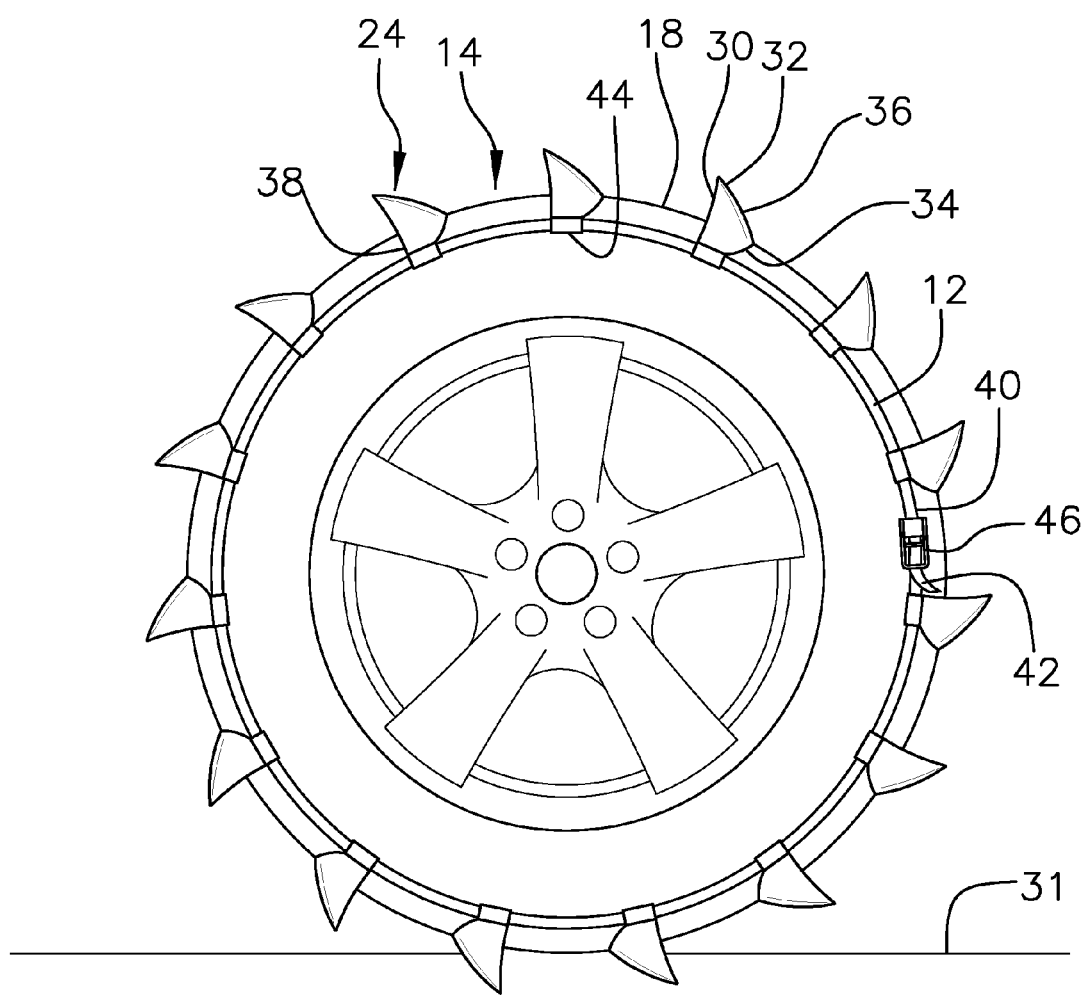
FIG. 4 is a right side view of an embodiment of the disclosure.

As best illustrated in FIGS. 1 through 4, the tire traction assembly 10 generally comprises a band 12 is that is positionable on a tire 14. The band 12 abuts an outside surface 16 of a tread portion 18 of the tire 14 so the band 12 extends around an entire circumference of the tread portion 18 of the tire 14. Continuing, the band 12 is one of a pair of bands 12 that are each selectively positionable on an associated one of a first lateral side 20 and a second lateral side 22 of the tread portion 18 of the tire 14. Each of the bands 12 may have a length between 91 cm and 122 cm so the assembly 10 may be utilized on a plurality of sizes of tires 14.

A paddle 24 is provided that is elongated along a longitudinal axis extending between a first end 26 and a second end 28 of the paddle 24. A front side 30 of the paddle 24 is concavely curvilinear with respect to a top side 32 and a bottom side 34 of the paddle 24 so the front side 30 of the paddle 24 is cupped. A back side 36 of the paddle 24 is curved rearwardly away from the front side 30 of the paddle 24. The paddle 24 has a saw tooth cross section taken along the longitudinal axis extending through the first 26 and second 28 ends of the paddle 24. Lastly, the paddle 24 may have a length between 12 cm and 25 cm and a width between 5 cm and 10 cm.

The bottom side 34 of the paddle 24 abuts the outside surface 16 of the tread portion 18 of the tire 14 when the pair of bands 12 is wrapped around the tire 14. Continuing, the paddle 24 extends between the first lateral side 20 and the second lateral side 22 of the tread portion 18 of the tire 14. The front side 30 of the paddle 12 engages a granular material when the tire 14 is rotated. Additionally, the granular material 31 may comprise sand or other similar granular material 31.

A pair of retaining portions 38 of the paddle 24 extends downwardly from the bottom side 34 of the paddle 24 proximate an associated one of the first 26 and second 28 ends of the paddle 24. Each of the retaining portions 38 of the paddle 24 abuts an associated one of the first 20 and second lateral 22 sides of the tread portion 18 of the tire 14 when the pair of bands 12 is wrapped around the tire 14. The retaining portions 38 of the paddle 24 prevents the paddle 24 from moving laterally along the tread portion 18 of the tire 14. Lastly, the paddle 24 is one of a plurality of paddles 24 that are evenly distributed between a first end 40 and a second end 42 of the pair of bands 12.

A coupling channel 44 is coupled to and extends downwardly from the bottom side 34 of the paddle 24. The coupling channel 44 extends between each of the front 30 and back 36 sides of the paddle 24. Moreover, the coupling channel 44 is one of a pair of coupling channels 44 each positioned proximate an associated one of the pair of retaining portions 38 of the paddle 24. Each of the pair of bands 12 extends through an associated one of the pair of coupling channels 44 so the plurality of paddles 24 is retained on the pair of bands 12.

A coupler 46 is coupled to the first end 40 of the band 12. The coupler 46 insertably receives the second end 42 of the band 12 after the band 12 is wrapped around the tire 14 so the coupler 46 retains the band 12 on the tire 14. Additionally, the coupler 46 may be a ratcheting coupler of any conventional design. The coupler 46 is one of a pair of couplers 46 each coupled to the first end 40 of an associated one of the pair of bands 12.

In use, each of the pair of bands 12 is wrapped around the tire 14 so the plurality of paddles 24 is positioned on the tread portion 18 of the tire 14. The second ends 42 of each of the pair of bands 12 is inserted into the associated one of the pair of couplers 46. Continuing, the pair couplers 46 are each ratcheted until the pair of bands 12 is tightened around the tire 14. The assembly 10 provides additional traction while driving in the granular material 31.

With respect to the above description, it is to be realized that the optimum dimensional relationship for the various components of the assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A tire traction assembly for increasing traction in a granular material, said assembly comprising:
   a band configured to be wrapped around a tire;
   a paddle coupled to said band wherein said paddle is configured to engage the granular material when the tire is rotated;
   a coupler coupled to said band wherein said coupler retains said band on the tire;
   a front side of said paddle being concavely curvilinear with respect to a top side and a bottom side of said paddle wherein said front side of said paddle is cupped.

2. The assembly according to claim 1, further comprising said band being positionable on the tire wherein said band abuts an outside surface of a tread portion of the tire wherein said band extends around an entire circumference of the tread portion of the tire.

3. The assembly according to claim 2, further comprising said band being one of a pair of said bands each being selectively positionable on an associated one of a first lateral side and a second lateral side of the tread portion of the tire.

4. The assembly according to claim 1, further comprising said paddle being elongated along a longitudinal axis extending between a first end and a second end of said paddle.

5. The assembly according to claim 1, further comprising a coupling channel coupled to and extending downwardly from a bottom side of said paddle wherein said coupling channel extends between each of a front side and a back side of said paddle.

6. The assembly according to claim 5, further comprising said coupling channel being one of a pair of said coupling channels each positioned proximate an associated one of a first end and a second end of said paddle.

7. The assembly according to claim 1, further comprising each of a pair of said bands extending through an associated one of a pair of coupling channels wherein said paddle is retained on said band.

8. The assembly according to claim 1, further comprising a back side of said paddle being curved rearwardly away from a front side of said paddle wherein said paddle has a saw tooth cross section taken along a longitudinal axis extending through a first end and a second end of said paddle.

9. The assembly according to claim 1, further comprising a bottom side of said paddle abutting an outside surface of a tread portion of the tire when a pair of said bands is wrapped around the tire wherein said paddle extends between a first lateral side and a second lateral side of the tread portion of the tire.

10. The assembly according to claim 1, further comprising said paddle being one of a plurality of said paddles being evenly distributed between a first end and a second end of a pair of said bands.

11. The assembly according to claim 1, further comprising said coupler being coupled to a first end of said band wherein said coupler insertably receives a second end of said band after said band is wrapped around the tire.

12. The assembly according to claim 11, further comprising said coupler being one of a pair of said couplers each coupled to a first end of an associated one of a pair of said bands.

13. A tire traction assembly for increasing traction in a granular material, said assembly comprising:
   a band configured to be wrapped around a tire;
   a paddle coupled to said band wherein said paddle is configured to engage the granular material when the tire is rotated;
   a coupler coupled to said band wherein said coupler retains said band on the tire;
   said band being positionable on the tire wherein said band abuts an outside surface of a tread portion of the tire wherein said band extends around an entire circumference of the tread portion of the tire;
   said band being one of a pair of said bands each being selectively positionable on an associated one of a first lateral side and a second lateral side of the tread portion of the tire;
   said paddle being elongated along a longitudinal axis extending between a first end and a second end of said paddle;
   a coupling channel coupled to and extending downwardly from a bottom side of said paddle wherein said coupling channel extends between each of a front side and a back side of said paddle;
   said coupling channel being one of a pair of said coupling channels each positioned proximate an associated one of a first end and a second end of said paddle;

each of a pair of said bands extending through an associated one of a pair of coupling channels wherein said paddle is retained on said band;

wherein a front side of said paddle being concavely curvilinear with respect to a top side and a bottom side of said paddle wherein said front side of said paddle is cupped.

14. The assembly according to claim 13 wherein a back side of said paddle being curved rearwardly away from a front side of said paddle wherein said paddle has a saw tooth cross section taken along a longitudinal axis extending through a first end and a second end of said paddle.

15. The assembly according to claim 14 wherein a bottom side of said paddle abutting an outside surface of a tread portion of the tire when a pair of said bands is wrapped around the tire wherein said paddle extends between a first lateral side and a second lateral side of the tread portion of the tire.

16. The assembly according to claim 15 wherein said paddle being one of a plurality of said paddles being evenly distributed between a first end and a second end of a pair of said bands.

17. The assembly according to claim 16 wherein said coupler being coupled to a first end of said band wherein said coupler insertably receives a second end of said band after said band is wrapped around the tire.

18. The assembly according to claim 17 wherein said coupler being one of a pair of said couplers each coupled to a first end of an associated one of a pair of said bands.

* * * * *